US012631308B2

(12) United States Patent
Cramer et al.

(10) Patent No.: US 12,631,308 B2
(45) Date of Patent: May 19, 2026

(54) LENS HOLDING ARRANGEMENT

(71) Applicant: Hella GmbH & Co. KGaA, Lippstadt (DE)

(72) Inventors: Herbert Cramer, Rüthen (DE); Florian Herold, Bielefeld (DE); Rainer Kauschke, Lippstadt (DE); Frank Paßgang, Lippstadt (DE); Christian Schimon, Lippstadt (DE); Sonja Seibt, Warburg (DE); Jürgen Wessling, Geseke (DE); Martin Wüller, Warendorf (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 299 days.

(21) Appl. No.: 18/477,076

(22) Filed: Sep. 28, 2023

(65) Prior Publication Data

US 2024/0035638 A1 Feb. 1, 2024

Related U.S. Application Data

(63) Continuation of application No. PCT/EP2022/056641, filed on Mar. 15, 2022.

(30) Foreign Application Priority Data

Mar. 30, 2021 (DE) .......................... 102021108094.0

(51) Int. Cl.
| | |
|---|---|
| *F21S 41/29* | (2018.01) |
| *F21S 41/255* | (2018.01) |
| *G02B 7/02* | (2021.01) |

(52) U.S. Cl.
CPC ............. *F21S 41/29* (2018.01); *F21S 41/255* (2018.01); *F21S 41/295* (2018.01); *G02B 7/021* (2013.01); *G02B 7/026* (2013.01)

(58) Field of Classification Search
CPC .......... G02B 7/02; G02B 7/021; G02B 7/022; G02B 7/023; G02B 7/025; G02B 7/026
See application file for complete search history.

(56) References Cited

U.S. PATENT DOCUMENTS

| | | | |
|---|---|---|---|
| 3,749,479 A | * | 7/1973 | Kempf ................... G02B 7/021 |
| | | | 359/819 |
| 4,685,036 A | | 8/1987 | Loewe et al. |

(Continued)

FOREIGN PATENT DOCUMENTS

| | | |
|---|---|---|
| CN | 209839962 U | 12/2019 |
| DE | 4305633 A1 | 10/1993 |

(Continued)

*Primary Examiner* — Ephrem Z Mebrahtu
(74) *Attorney, Agent, or Firm* — Husch Blackwell LLP

(57) ABSTRACT

A lens holding arrangement for lenses of an illumination device for vehicles is provided. The holding arrangement includes a surrounding body which surrounds a number of lenses arranged coaxially to each other and at an axial distance to each other. The holding arrangement also includes a number of attachment elements on an inner surface to which the lenses make contact with a front or back edge. The surrounding body is segmented with a number of segments that surround in each case the lenses in a circumferential angle range (φ), and with fasteners for fastening the segments.

12 Claims, 2 Drawing Sheets

(56)          References Cited

U.S. PATENT DOCUMENTS

| | | | | |
|---|---|---|---|---|
| 5,177,641 | A | * | 1/1993 | Kobayashi ............. G02B 7/026 |
| | | | | 359/830 |
| 6,172,822 | B1 | | 1/2001 | Belliveau et al. |
| 2006/0072218 | A1 | * | 4/2006 | Kageyama ............. G02B 7/021 |
| | | | | 359/819 |
| 2013/0223090 | A1 | | 8/2013 | Willeke et al. |

FOREIGN PATENT DOCUMENTS

| | | | | |
|---|---|---|---|---|
| DE | 102012206831 | A1 | | 10/2013 |
| DE | 102014216127 | A1 | | 2/2016 |
| FR | 3022977 | A1 | | 1/2016 |
| JP | 2008204903 | A | | 9/2008 |
| JP | 2010078920 | A | * | 4/2010 |
| WO | 2019194276 | A1 | | 10/2019 |

* cited by examiner

LENS HOLDING ARRANGEMENT

CROSS REFERENCE

This application claims priority to PCT Application No. PCT/EP2022/056641, filed Mar. 15, 2022, which itself claims priority to German Application No. 10 2021 108094.0, filed Mar. 30, 2021, the entireties of both of which are hereby incorporated by reference.

FIELD OF THE INVENTION

The invention relates to a lens holding arrangement for lenses of an illumination device for vehicles with a surrounding body that surrounds a number of lenses arranged coaxially to each other and at an axial distance to each other and which feature on an inner surface a number of attachment elements to which the lenses make contact with a front or back edge.

BACKGROUND OF THE INVENTION

WO 19194276 A1 discloses a lens holding arrangement for lenses of an illumination device for vehicles that surrounds a hollow cylinder-shaped surrounding body that clasps a plurality of lenses arranged to be staggered in an axial direction. On an inner surface, the surrounding body features attachment elements such that the lenses are fixed in an axial direction. A flange is molded on two opposite side of the surrounding body such that the surrounding body can be fixed to a holder via a screw connection. An increased amount of assembly work arises in particular in the event of a high number of lenses arranged coaxially extending crosswise in different directions, as disclosed for example in DE 10 2012 206 831 A1.

BRIEF SUMMARY OF THE INVENTION

The task of the present invention is consequently to refine a lens holding arrangement for lenses of an illumination device for vehicles in such a way that the amount of assembly work can be reduced in particular in the case of a large number of lenses.

To solve the task, the surrounding body is fashioned to be segmented with a number of segments that each surround the lenses in a circumferential angle range, and with fasteners for fastening the segments.

In accordance with the invention, there is a surrounding body made of several segments surrounding the lenses that are arranged relative to each other in a mounted position such as to be moveable. As an advantage, the lenses can be positioned one after the other or simultaneously on a first segment. A further step involves the joining of the first segment with at least one further segment, wherein all lenses are arranged in an exact position. This makes it possible to reduce the amount of manufacturing work necessary. From the perspective of cost-effective production, the segments can, for example, be manufactured in a deep drawing process or injection molded from plastic or metal or a composite material or a fiber-reinforced plastic.

In accordance with a refinement of the invention, the segments are fashioned as half-shells, wherein each of the half-shells extends in a circumferential angle range of 180°. The one half-shell serves to accommodate the lenses during assembly. Moving the second half-shell into the assembly position in which the lenses are clamped by the two half-shells facilitates quick and simple assembly, wherein the individual lenses are held in exact position.

In accordance with a refinement of the invention, the segments or, as the case may be, half-shells feature a fastening flange protruding laterally to which the fasteners clamp for fixing the segments or, as the case may be, half-shells.

In accordance with a refinement of the invention, an axial compensation means is allocated to the fastening flanges for arranging the segments secure in position to each other in an axial direction. For example, the axial compensation means can be fashioned as an oblong hole such that tolerance compensation can be provided in the event of adjusting the segments.

In accordance with a refinement of the invention, firstly attachment elements and secondly spring elements are provided for on the inner surface of the segments and/or the half-shells by means of which the lenses are held precisely in the assembly position. While the segments or, as the case may be, half-shells, act together with the attachment elements to hold the lenses, the spring elements effect a reduction in the position tolerance.

In accordance with a refinement of the invention, firstly at least two attachment elements arranged to be staggered to each other in a circumferential direction and secondly a number of spring elements are allocated to each of the lenses, wherein the spring elements are preferentially fashioned to act as a spring vertically to the contact face on the lens. As an advantage, this makes it possible to provide an arrangement free of play of the lenses within the surrounding body formed by the segments. Through the combination of attachment elements and spring elements, lenses are arranged within the surrounding body to be practically encapsulated and feature a clear relative position to each other. This makes is possible to provide a better mapping quality of the lighting technology system and a higher degree of efficiency due to the precise position of the lenses.

In accordance with a refinement of the invention, the spring element is fashioned as a metal spring element with a profiled surface structure such that scattered light can be absorbed. As an advantage, this makes it possible to implement an increase in contrast and protection against what is known as a burning glass effect from outside caused by insolation.

In accordance with a refinement of the invention, the inner surface of the segments is provided with a reflective surface. The lenses themselves are fashioned to be clear such that it is possible to provide the depth effect desired by the design technology of the objective formed in this way or, as the case may be, the lens arrangement.

In accordance with a refinement of the invention, the inner surface of the segment is designed to colored or painted or vapor coated such that the lenses feature in the cold appearance image an inherent color, for example blue, or, as the case may be, in the warm appearance image a targeted color effect of the lenses is generated in an angled side view.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

A lens holding arrangement 1 is a component of an illumination device for vehicles that serves, for example, for generating a low-beam function, high-beam function or the like.

The lens holding arrangement 1 features a plurality of lenses 2 and is arranged in the main radiation direction 3 in front of a light source 4. The light source 4 can, for example, be fashioned as an LED light source. The lenses 2 combined in the lens holding arrangement 1 that are arranged to be staggered axially to each other serve to map the light source 4 corresponding to a specified light distribution. The light source 4 can feature a plurality of lighting elements arranged to be distributed on an array. The lenses 2 are arranged coaxially to each other. The light source 4 is arranged on an optical axis A of the lenses 2.

Figure 2:
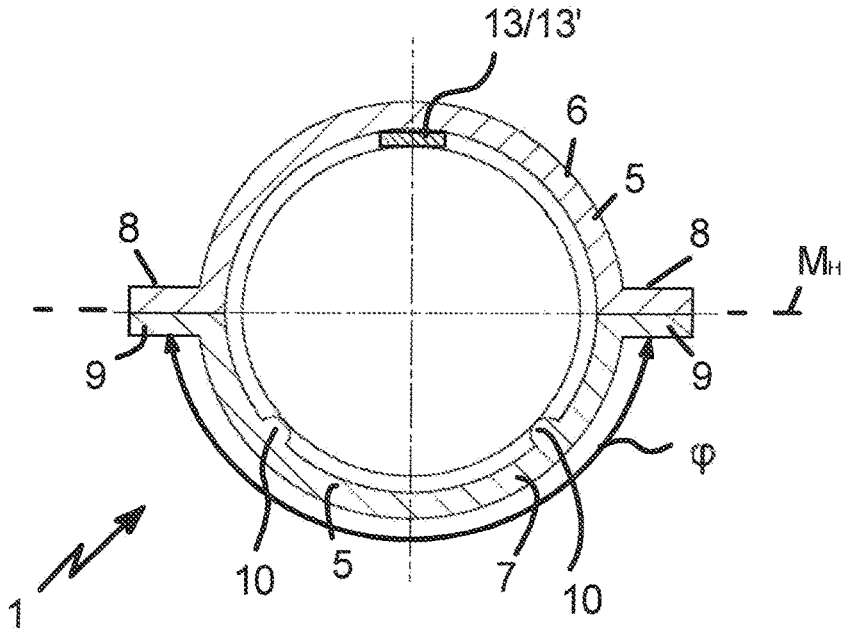
FIG. 2 is a cross section through the lens holding arrangement along a reference line II-II in FIG. 1.

The lens holding arrangement 1 comprises a surrounding body 5, which encompasses the lenses 2 and holds them in the intended position relative to the light source 4. The surrounding body 5 of the lens holding arrangement 1 is fashioned as several parts in the present sample embodiment and consists of two segments that are each fashioned as half-shells 6, 7. One upper half-shell 6 and a lower half-shell 7 each extend in a circumferential angle range φ of 180°. Ends of the circumference of the half-shells 6, 7 are fashioned as a fastening flange 8, 9 that make contact to each other over a surface in the installation position of the half-shells 6, 7, cf. FIG. 2.

Figure 1:
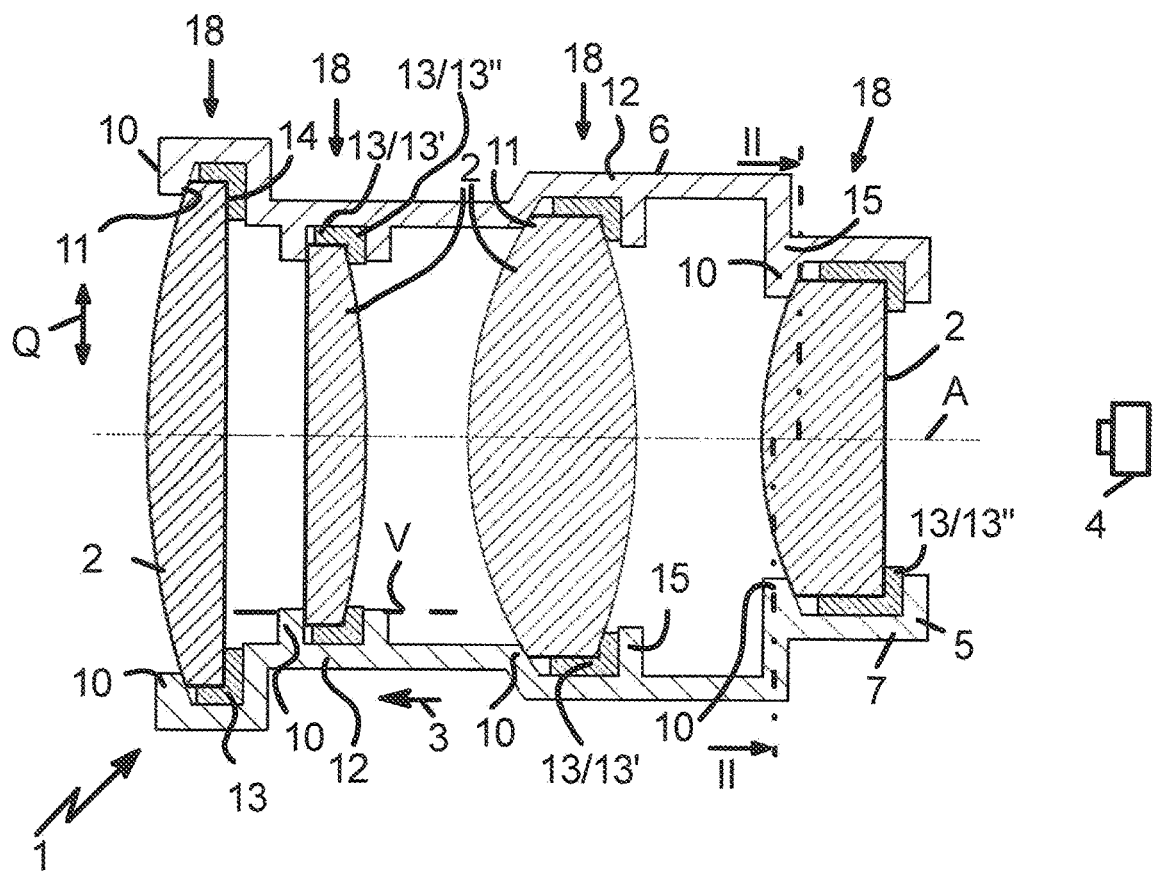
FIG. 1 is a schematic vertical section through a lens holding arrangement.

As can be seen from FIG. 1, the half-shells 6, 7 are fashioned as identical parts, wherein they feature holding sections 18 for holding the lenses 2 in which each of the lenses 2 are arranged in a secure position, practically encapsulated. The half-shells 6, 7 are fashioned to be profiled as a function of the transverse extension Q or, as the case may be, the diameter of the lenses 2. The transverse direction Q runs vertically to the optical axis A.

For holding the lenses 2 in exact position, the half-shells 6, 7 each feature in the holding section 18 a number of attachment elements 10. In the present sample embodiment, at least three attachment elements 10 are arranged in the front area of the holding section 18 of the lens holding arrangement 1, to which attachment elements each of the lenses 2 makes contact with a front edge 11. For example, the lower half-shell 7 may feature two attachment elements 10 and the upper half-shell 6 a single attachment element 10. By doing so, a clear positioning in a single axial direction of the lenses 2 is specified.

The attachment elements 10 each protrude from a jacket surface 12 of the half-shells 6, 7 inwards in a radial direction.

In the area of a back of the respective holding sections 18, the half-shells 6, 7 each feature spring elements 13 that, acting as a spring, support a back edge 14 of the lenses 2, and thus ensure an arrangement without play of the lenses 2 in the lens holding arrangement 1.

The spring elements 13 are each fastened on an inner surface of the jacket surface 12 and on a front side of a cantilever 15 protruding radially inwards from the jacket surface 12. In the present sample embodiment, the lenses 2 are each supported secure in position on a back edge 14 and on a jacket surface 16 of the same by the spring element 13 preferentially fashioned as a single piece.

As can be seen from FIG. 1, the spring element 13 features an axial section 13' that makes contact with a surface of the lens 2 on the jacket side, and a radial section 13" that makes contact on the back edge 14 or, as the case may be, back surface of the lens 2. Preferentially, the axial section 13' and the radial section 13" are connected to each other as a single piece. The axial section 13' is fashioned in such a way that the spring effect is directed in a radial direction. The radial section 13" is fashioned in such a way that the spring effect takes an axial direction. To clamp in the lenses 2, an imaginary connecting line V crosses firstly the attachment element 10 and secondly the radial section 13" of the spring element 13 of a respective holding section 18 of the lens holding arrangement 1.

In accordance with an alternative embodiment of the invention (not shown), the spring element 13 may also be arranged in such a way that merely the back edge 14 of the lenses 2 make contact to the spring element 13.

The spring elements 13 are fashioned in such a way that a spring effect runs vertically to a surface of the lens 2 to which the spring element 13 makes contact. In the present sample embodiment, the spring-based securing of the position of the lenses 2 is implemented both in an axial and a radial direction.

In the present sample embodiment, the respective lenses 2 make contact over a surface with or, as the case may be, are supported over a surface by the spring elements 13. In accordance with an alternative embodiment, the contact between the spring elements 13 and the lenses 2 can also be implemented at points and thus not over a surface. This applies in the same way to the contact of the attachment elements 10 at the lenses 2.

It should be noted that per holding section 18 at least three attachment elements 10 and/or three spring elements 13 are provided for. In accordance with an alternative embodiment of the invention (not shown), the spring elements 13 can also clamp in a main beam direction 3 in front of the respective lens 2 and the number of attachment elements 10 at a back of the respective lenses 2.

In the present sample embodiment, the lens holding arrangement 1 is fashioned to be symmetrical to a horizontal central axis $M_H$ of the same.

Preferentially, the spring elements 13 are fashioned as metal spring elements that preferentially feature a profiled structure or a rib structure. This makes it possible to reduce the degree of reflection of the light hitting the spring element 13 and thus to absorb scattered light.

The spring elements 13 can, for example, be fastened by means of a riveted or welded or soldered or adhesive bond to the cantilever 15 of the half-shells 6, 7.

In accordance with an alternative embodiment of the invention, the spring elements 13 can be make of a malleable plastic material, where the spring elements are manufactured by means of injection molding preferentially in a two-component injection-molding process together with the half-shells 6, 7 at the same time.

Figure 3:
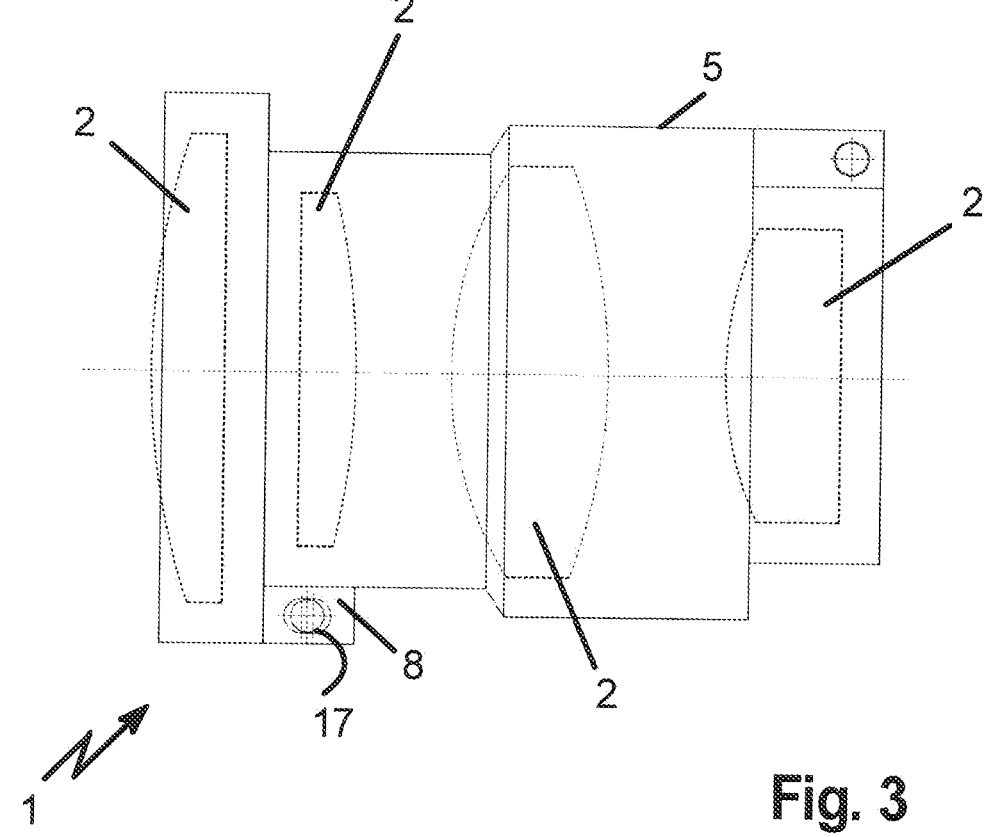
FIG. 3 is a top view onto the lens holding arrangement.

As can be seen from FIG. 3, the fastening flange 8 of at least one of the half-shells 6, 7 features an oblong hole 17 as an axial compensation means that is fashioned to be oriented in an axial direction. Due to the oblong hole 17 being longer in an axial direction than in a transverse direction (radial direction), it is possible to implement axial compensation when adjusting the half-shells 6, 7 relative to each other. After adjusting the half-shells 6, 7 to each other, it is possible to fix the fastening flanges 8, 9 to each other, for example, by means of a latching element or another type of fastener. These half-shells 6, 7 are then friction connected to each other.

Adjustment of the half-shells 6, 7 to each other is secured preferentially through these having a self-centering geometry, wherein trivalent fixing is achieved on a back of the surrounding body 5 formed in this way facing towards one of the light sources 4. While the trivalent fixing in three spatial directions arranged orthogonally to each other is performed at the back of the surrounding body 5, bivalent fixing can be performed in two directions arranged orthogonally to each other in the area of a front of the surrounding body 5. This ensures that the positional accuracy of the lens 2 of the lens holding arrangement 1 facing the light source 4 is larger than with a lens 2 arranged further away from the light source 4.

In the present sample embodiment, the lenses 2 are manufactured from a glass material. In accordance with an alternative embodiment of the invention, the lenses 2 can be made from a plastic material, wherein the spring elements 13 and/or the attachment elements 10 are preferentially molded onto the lenses 2. With this embodiment, the spring elements 13 and/or the attachment elements 10 are made of the same material as the lenses 2 themselves.

An inner surface of the half-shells 6, 7 can be fashioned as a reflective surface that reflects incoming light when the vehicle is at a standstill. In combination with a clear surface of the lenses 2, i.e. without microstructures or similar, it is possible to obtain a deep insight into the lens arrangement 1 such that an open appearance of the lens holding arrangement 1 is achieved.

In accordance with an alternative embodiment of the invention (not shown), the two half-shells 6, 7 can also be arranged so as to be pivotable by means of a film hinge with an axial rotary axis.

In the present sample embodiment, assembly is performed in two steps. In a first step, the lenses 2 are positioned on the lower half-shell 7. In a second step, the upper half-shell 6 is then translationally guided to the lower half-shell 7, wherein an upper side of the lenses 2 is clamped by means of the attachment elements 10 and the spring elements 13 of the upper half-shell 6 in an exact position between the two half-shells 6, 7.

In accordance with an alternative embodiment (not shown) the lens holding arrangement 1 can also accommodate four or five lenses 2 or accommodate a total of only 2 lenses. The half-shells 6, 7 are manufactured preferentially from a metallic material.

In accordance with an alternative embodiment of the invention, the surrounding body 5 can also be formed from three or more segments, wherein the segments each extend in an obtuse circumferential angle range.

LIST OF REFERENCE NUMBERS

1 Lens holding arrangement
2 Lenses
3 Main radiation direction
4 Light sources
5 Surrounding body
6 Half-shells
7 Half-shells
8 Fastening flange
9 Fastening flange
10 Attachment elements
11 Front edge
12 Jacket surface

13,13',13″ Spring element, axial section, radial section
14 Back edge
15 Cantilever
16 Jacket surface
17 Oblong hole
18 Holding section
A Axis
$M_H$ Central plane
V Connecting line
φ Circumferential angle range

We claim:

1. A lens holding arrangement for lenses of an illumination device for vehicles, the lens holding arrangement comprising:
   a surrounding body surrounding a plurality of lenses, wherein the lenses of the plurality of lenses are arranged coaxially to each other and at an axial distance to each other; and
   a plurality of attachment elements on an inner surface of the surrounding body, wherein each lens of the plurality of lenses contacts a front edge or a back edge of an associated attachment element of the plurality of attachment elements,
   wherein the surrounding body is segmented with a plurality of segments, wherein each segment of the plurality of segments surrounds the plurality of lenses in a circumferential angle range (φ)
   wherein each segment of the plurality of segments includes a fastening flange,
   wherein adjacent segments of the plurality of segments are connected to each other via a fastener extending through the fastening flanges, and
   wherein at least one of the fastening flanges of the adjacent segments includes an axial compensation means that allows axial adjustment of the adjacent segments relative to one another while the adjacent segments are connected via the fastener.

2. The lens holding arrangement in accordance with claim 1, wherein the segments are fashioned to be bowl-shaped and extend at least in an obtuse circumferential angle range.

3. The lens holding arrangement in accordance with claim 1, wherein the segments are half-shells that each extend in a circumferential angle range ( ) of 180°.

4. The lens holding arrangement in accordance with claim 3, wherein each half-shell includes the fastening flange at an end of a circumference of the half-shell.

5. The lens holding arrangement in accordance with claim 1, wherein the axial compensation means is an oblong hole oriented in an axial direction.

6. The lens holding arrangement in accordance with claim 3, wherein each lens of the plurality of lenses is associated with at least two attachment elements of the plurality of attachment elements, wherein the at least two attachments elements are staggered to each other in a circumferential direction and protrude from the inner surface of the surrounding body and contact the front edge or the back edge of the associated lens, and wherein each lens of the plurality of lenses is braced by a spring element, wherein the spring element contacts the front edge or the back edge of the lens opposite from the at least two attachment elements for positioning of the lens secure in position in the lens holding arrangement.

7. The lens holding arrangement in accordance with claim 6, wherein the spring element has a spring effect running vertically to a surface of the lens on which the spring element makes contact.

8. The lens holding arrangement in accordance with claim 6, wherein a plurality of spring elements are associated with each lens of the plurality of lenses, wherein an axial section of each spring element of the plurality of spring elements contacts a jacket-side surface of the associated lens, wherein a spring effect of the axial section of each spring element of the plurality of spring elements is directed in a radial direction, wherein a radial section of each spring element of the plurality of spring elements contacts side of the lens opposite the attachment element on the front edge or back edge of the associated lens, and wherein the spring effect of the radial section of each spring element of the plurality of spring elements is directed in an axial direction.

9. The lens holding arrangement in accordance with claim 6, wherein the spring element is fastened to a cantilever of at least one of the segments, wherein the cantilever protrudes radially from a jacket surface of the half-shells.

10. The lens holding arrangement in accordance with claim 6, wherein the spring element is a metal spring element with a profiled surface structure.

11. The lens holding arrangement in accordance with claim 1, wherein the segments include a reflective surface on an inside and each of the lenses is clear.

12. The lens holding arrangement in accordance with claim 1, wherein the segments include an absorption or inherent coloring on an inside such that the lenses feature a dark or colored appearance.

\* \* \* \* \*